(12) United States Patent
Kanai et al.

(10) Patent No.: US 11,313,308 B2
(45) Date of Patent: Apr. 26, 2022

(54) INJECTION CONTROL DEVICE

(71) Applicant: DENSO CORPORATION, Kariya (JP)

(72) Inventors: Kazumasa Kanai, Kariya (JP); Yohei Suganuma, Kariya (JP); Hiroyuki Fukuda, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/357,329

(22) Filed: Jun. 24, 2021

(65) Prior Publication Data
US 2021/0404408 A1 Dec. 30, 2021

(30) Foreign Application Priority Data

Jun. 29, 2020 (JP) .............................. JP2020-111596

(51) Int. Cl.
*F02D 41/22* (2006.01)
*F02D 41/40* (2006.01)
*F02D 41/20* (2006.01)

(52) U.S. Cl.
CPC .......... *F02D 41/221* (2013.01); *F02D 41/20* (2013.01); *F02D 41/40* (2013.01); *F02D 2041/2034* (2013.01); *F02D 2041/2048* (2013.01); *F02D 2041/224* (2013.01)

(58) Field of Classification Search
CPC ........ F02D 41/221; F02D 41/20; F02D 41/40; F02D 2041/2034; F02D 2041/2048; F02D 2041/224
See application file for complete search history.

(56) References Cited

U.S. PATENT DOCUMENTS

| | | | | |
|---|---|---|---|---|
| 4,379,332 A | * | 4/1983 | Busser | F02D 41/26 701/105 |
| 4,423,713 A | * | 1/1984 | Sami | F02D 41/408 123/357 |
| 5,050,562 A | * | 9/1991 | Ishii | F02D 41/2454 123/406.44 |
| 6,694,945 B2 | * | 2/2004 | Kawaguchi | F02D 41/248 123/299 |
| 6,755,176 B2 | * | 6/2004 | Takeuchi | F02D 41/402 123/299 |

(Continued)

FOREIGN PATENT DOCUMENTS

JP 2016-033343 A 3/2016

*Primary Examiner* — Phutthiwat Wongwian
*Assistant Examiner* — Susan E Scharpf
(74) *Attorney, Agent, or Firm* — Posz Law Group, PLC

(57) ABSTRACT

An injection control device includes: a drive control unit that controls energization by correcting an energization instruction time when injecting the fuel by executing the current-drive, and includes an energization time correction amount calculation unit that calculates an energization time correction amount by performing area correction on a current flowing through the fuel injection valve; an abnormality determination unit that determines an abnormality in a control system of the drive control unit; and a correction amount subtraction setting unit that stops a calculation of the energization time correction amount when the abnormality determination unit determines an abnormality, and controls the drive control unit to directly or stepwise reduce the energization time correction amount at an abnormality determination.

6 Claims, 7 Drawing Sheets

(56) References Cited

U.S. PATENT DOCUMENTS

| | | | |
|---|---|---|---|
| 7,899,603 B2* | 3/2011 | Yamamoto | F02D 41/2438 |
| | | | 701/104 |
| 8,739,764 B2* | 6/2014 | Nakamura | F02D 41/2467 |
| | | | 123/479 |
| 11,181,066 B2* | 11/2021 | Inaba | F02D 41/20 |
| 11,181,067 B1* | 11/2021 | Kato | F02D 41/26 |
| 11,181,068 B1* | 11/2021 | Kato | F02D 41/221 |
| 2008/0184968 A1* | 8/2008 | Matsuura | F02D 41/20 |
| | | | 123/490 |
| 2008/0228374 A1* | 9/2008 | Ishizuka | F02D 41/3836 |
| | | | 701/103 |
| 2009/0055084 A1* | 2/2009 | Ishizuka | F02D 41/40 |
| | | | 701/105 |
| 2016/0186741 A1* | 6/2016 | Sakamoto | F02M 63/0043 |
| | | | 417/290 |
| 2019/0178198 A1* | 6/2019 | Okamura | F02M 59/10 |
| 2020/0284214 A1* | 9/2020 | Inaba | F02D 41/40 |
| 2021/0372337 A1* | 12/2021 | Yoshikawa | F02D 41/20 |
| 2021/0372338 A1* | 12/2021 | Suganuma | F02D 41/20 |
| 2021/0372340 A1* | 12/2021 | Suganuma | F02D 41/221 |

* cited by examiner

INJECTION CONTROL DEVICE

CROSS REFERENCE TO RELATED APPLICATION

The present application claims the benefit of priority from Japanese Patent Application No. 2020-111596 filed on Jun. 29, 2020. The entire disclosure of the above application is incorporated herein by reference.

TECHNICAL FIELD

The present invention relates to an injection control device that controls opening and closing of a fuel injection valve.

BACKGROUND

An injection control device is used to inject fuel into an internal combustion engine by opening and closing a fuel injection valve. The injection control device opens the fuel injection valve that is electrically drivable by passing current to the fuel injection valve. In recent years, an ideal current profile for energization current based on a command injection quantity has been set, and the injection control device opens the fuel injection valve by applying current to the fuel injection valve on the basis of the ideal current profile.

SUMMARY

According to an example embodiment, an injection control device includes: a drive control unit that controls energization by correcting an energization instruction time when injecting the fuel by executing the current-drive, and includes an energization time correction amount calculation unit that calculates an energization time correction amount by performing area correction on a current flowing through the fuel injection valve; an abnormality determination unit that determines an abnormality in a control system of the drive control unit; and a correction amount subtraction setting unit that stops a calculation of the energization time correction amount when the abnormality determination unit determines an abnormality, and controls the drive control unit to directly or stepwise reduce the energization time correction amount at an abnormality determination.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
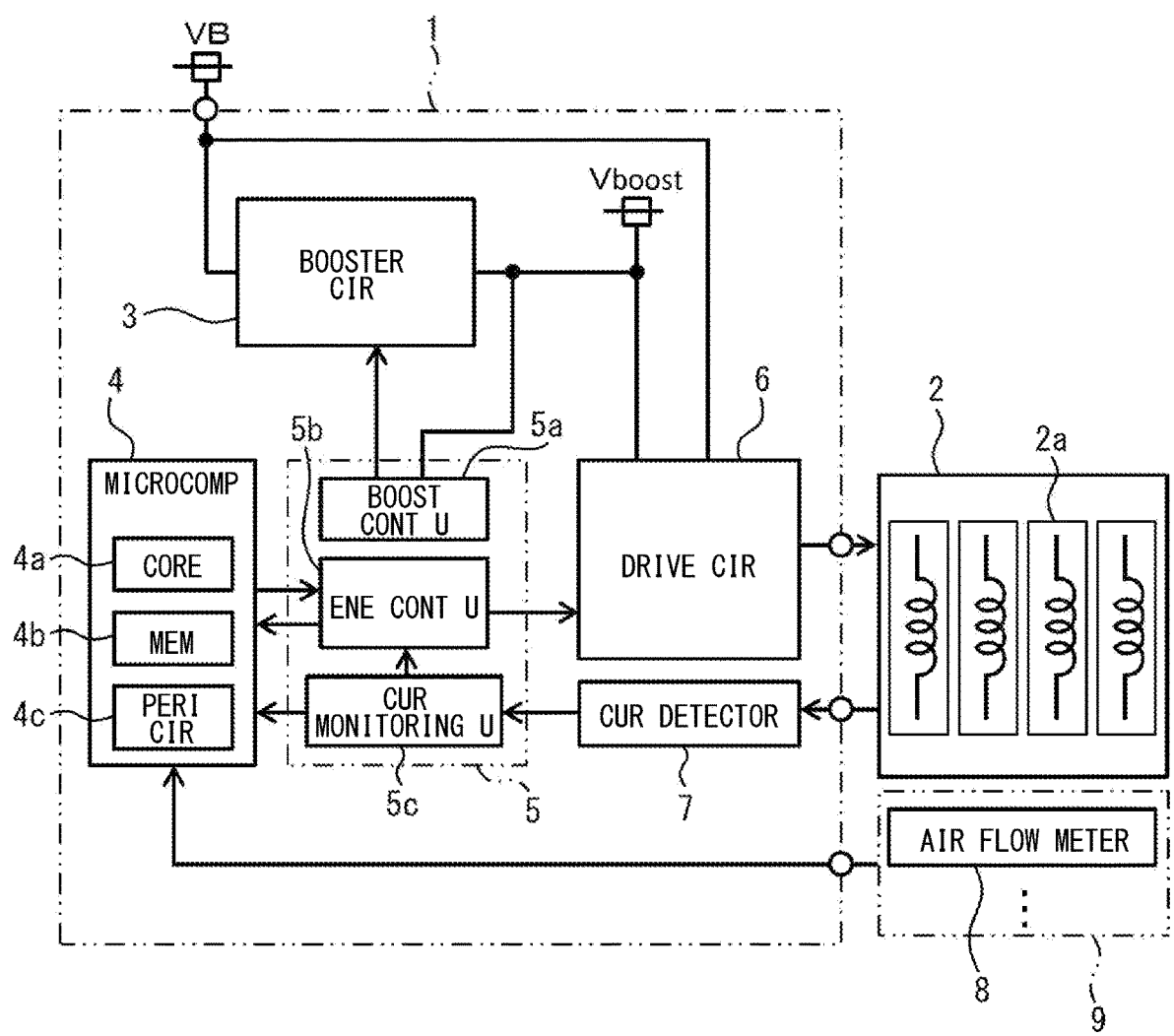
FIG. 1 is an electrical configuration diagram illustrating an embodiment.

If the gradient of energization current of the fuel injection valve becomes lower than the gradient of the ideal current profile due to various factors such as a peripheral temperature environment and aged deterioration, an actual injection quantity may be largely reduced from the command injection quantity, which may result in deterioration of an A/F value. In order to prevent such a problem, it is desirable to previously adjust an energization instruction time for energization to the fuel injection valve to a rather long time factoring in variations. However, if the rather long energization instruction time is ensured, the fuel efficiency may be reduced.

In view of this, the applicant of the present application proposes correction of the energization time using a current area correction technique based on an integrated current of the ideal current profile serving as a target current to reach a target peak current and an integrated current of detected current.

According to this method, when the actual energization current profile becomes lower than the ideal current profile, the energization instruction time is corrected by executing an area correction process in real time, thereby making it possible to drive the fuel injection valve with the command injection quantity previously specified.

However, in the fuel injection valve and the system that drives and controls the fuel injection valve, if the correction amount of the energization instruction time is set larger than the upper limit due to deterioration over time or deterioration of the current detection accuracy, the operation of the energization time correction process by the area correction technology may be stopped. At this time, the correction amount of the energization instruction time is canceled, but if it is canceled suddenly, the A/F roughness may occur.

In view of the consideration of the above circumstances, an injection control device is provided to be capable of performing the operation while appropriately maintaining the driving state of the fuel injection valve with suppressing A/F roughness even when the operation of the energization time correction process by the area correction technique is stopped as described above.

The injection control device according to the present embodiments is an injection control device that executes a current drive of a fuel injection valve that injects fuel into an engine, and includes: an energization time correction amount calculation unit that calculates the energization time correction amount by executing an area correction of the current flowing through the fuel injection valve when executing the current drive of the fuel injection valve to inject fuel; a drive control unit that corrects the energization instruction time and executes the energization control; an abnormality determination unit that determines an abnormality in the control system of the drive control unit when the energization time correction amount calculated by the drive control unit exceeds a predetermined upper limit value; and a correction amount subtraction setting unit that stops the calculation of the energization time correction amount by the energization time correction amount calculation unit when the abnormality determination unit determines that the control system of the drive control unit is abnormal, and controls the drive control unit to directly or stepwise subtract the energization time correction amount at the time of the abnormality determination.

By adopting the above configuration, the energization time correction amount calculation unit executes the area correction of the current flowing through the fuel injection valve to calculate the energization time correction amount, the abnormality determination unit determines whether or not the calculated energization time correction amount exceeds the upper limit value. When an abnormality is determined, the subtraction setting unit gradually reduces the last calculated energization time correction amount so that the energization time correction amount calculation unit can stop the correction process without causing any difficulty in the state of the internal combustion engine even when the load is low.

Hereinbelow, an embodiment of an injection control device will be described with reference to the drawings. As illustrated in FIG. 1, an electronic control unit (ECU) 1 is configured as, for example, an injection control device which controls driving of a solenoid fuel injection valve 2 (also called an injector). The fuel injection valve 2 directly injects fuel in multiple stages into an internal combustion engine mounted on a vehicle such as an automobile. Here, the fuel injection valves 2 for four cylinders are illustrated. However, the present invention can also be applied to a three-cylinder engine, a six-cylinder engine, or an eight-cylinder engine.

The electronic control unit 1 has an electrical configuration including a booster unit 3, a microcomputer 4, a control IC 5, a drive circuit 6, and a current detector 7. The electronic control unit 1 is used as an injection control device that controls injection of fuel. The microcomputer 4 includes one or more cores 4a, a memory 4b such as a ROM and a RAM, and a peripheral circuit 4c such as an A/D converter, and performs various control operations in accordance with a program stored in the memory 4b and sensor signals S acquired from various sensors 8.

The sensors 8 include, for example, a crank angle sensor which outputs a pulse signal every time a crank shaft rotates by a predetermined angle, a water temperature sensor which is disposed on a cylinder block of the internal combustion engine and detects the temperature of a cooling water, a fuel pressure sensor which detects the pressures of fuel at the time of injection, an air flow meter 9 which detects the amount of intake air, and an A/F sensor which detects an air-fuel ratio, that is, an A/F value of exhaust gas of the internal combustion engine. Further, the microcomputer 4 can calculate the load factor of the engine from the signal captured by the air flow meter 9 through the peripheral circuit 4c.

The microcomputer 4 calculates an engine speed from the pulse signal of the crank angle sensor and acquires the throttle opening from a throttle opening signal. The microcomputer 4 estimates the temperature of the fuel injection valve 2 from the cooling water temperature detected by the water temperature sensor. The microcomputer 4 also calculates a target torque required for the internal combustion engine on the basis of the throttle opening, a hydraulic pressure, and the A/F value, and calculates a required injection quantity serving as a target on the basis of the target torque.

The microcomputer 4 calculates an energization instruction time Ti of an energization instruction TQ on the basis of the required injection quantity serving as a target and the fuel pressure detected by the fuel pressure sensor. The microcomputer 4 calculates injection command timing for each cylinder on the basis of the sensor signals input thereto from the various sensors 8 described above and outputs the energization instruction TQ for fuel injection to the control IC 5 at the injection command timing.

The microcomputer 4 can calculate injection start time for each cylinder on the basis of the engine speed calculated from the pulse signal of the crank angle sensor.

The control IC 5 is an integrated circuit device such as an ASIC and includes, for example, a logic circuit, a control main body such as a CPU, a storage unit such as a RAM, a ROM, or an EEPROM, and a comparator (all of which are not illustrated).

The control IC 5 is configured to execute various control operations using hardware and software. The control IC 5 has functions of a boost control unit 5a, an energization control unit 5b1, and a current monitoring unit 5c.

The booster circuit 3 includes a booster type DC-DC converter and operates by inputting a battery voltage VB. The boost control unit 5a boosts and controls the battery voltage VB input to the boost circuit 3, and supplies the boost voltage Vboost from the boost circuit 3 to the drive circuit 6.

The drive circuit 6 is supplied from the battery voltage VB and the boost voltage Vboost. The drive circuit 6 applies voltage, that is, the boost voltage Vboost or the battery voltage VB to the solenoid coil 2a of the fuel injection valve 2 of each cylinder in accordance with energization control of the energization control unit 11 of the control IC 5, thereby driving the fuel injection valve 2 to cause the fuel injection valve 2 to inject fuel.

The current detector 7 includes a current detection resistor. The current monitoring unit 5c of the control IC 5 includes, for example, a comparator and an A/D converter (both of which are not illustrated), and monitors a current flowing through the solenoid coil 2a of the fuel injection valve 2 through the current detector 7.

Figure 2:
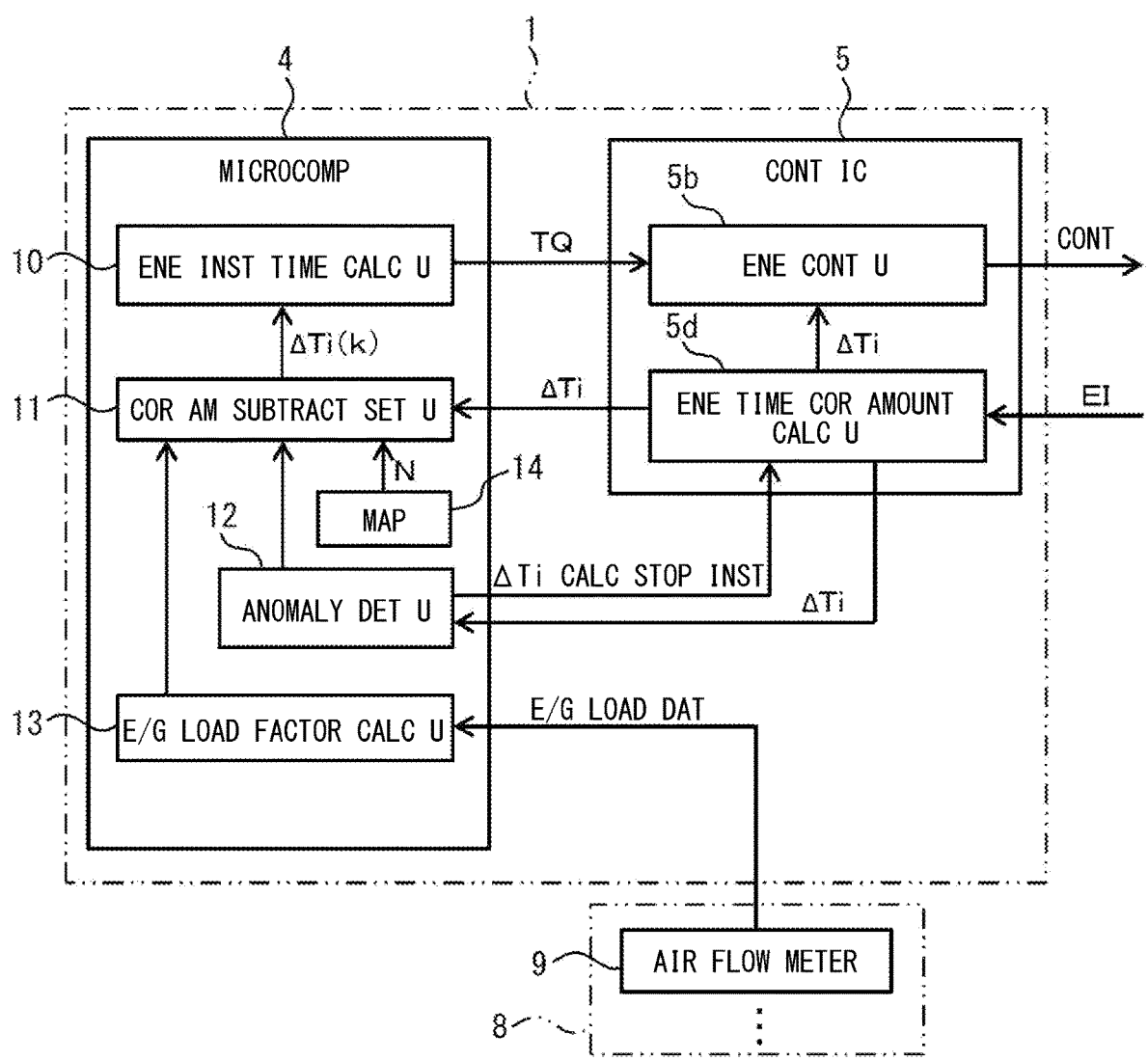
FIG. 2 is a functional block diagram of a microcomputer and a control IC.

FIG. 2 schematically illustrates a part of the functional configuration of the microcomputer 4 and the control IC 5. The microcomputer 4 functions as an energization instruction time calculation unit 10, a correction amount subtraction setting unit 11, an abnormality determination unit 12, an engine load factor calculation unit 13, and a map 14 when the core 4a executes a program stored in the memory 4b. The control IC 5 also has a function of an energization time correction amount calculation unit 5d serving as the area correction unit in addition to the functions of the boost control unit 5a, the energization control unit 5b, and the current monitoring unit 5c described above.

The energization instruction time calculation unit 10 calculates, at the start of injection control, the required injection quantity on the basis of the sensor signals S of the various sensors 8 related to the internal combustion engine and calculates the energization instruction time Ti of the energization instruction TQ. The energization instruction time Ti of the energization instruction TQ indicates a time for which an instruction to apply voltage, for example, the boost voltage Vboost to the fuel injection valve 2 is provided in injection control.

The energization instruction time calculation unit 10 sets correction coefficients α, β. The correction coefficients α is used to estimate the current difference between a normal current profile PI for a current to be passed to the fuel injection valve 2 and an actual energization current EI. The coefficient α is previously calculated according to, for example, the load characteristic of the fuel injection valve 2 and set to a value equal to or larger than zero. The coefficient α is previously recorded in the memory 4b through an α map.

The α map is a map for deriving the correction coefficient α from the energization instruction time Ti of the energization instruction TQ and the fuel pressure detected by the fuel pressure sensor at the time of injection and provided for setting the correction coefficient α in a range from when the current has not reached a peak current to when the current has exceeded the peak current. The correction coefficient α is provided for calculating an energization time correction amount ΔTi in Equations (1) to (4) described later. The energization time correction amount ΔTi can be increased by setting the correction coefficient α to a larger value and can also be made zero by setting the correction coefficient α to zero.

The correction coefficient β is used for estimating a peak current estimation value Ipki for injection control and previously set for correcting an error caused by the nonlinearity of the energization current EI according to, for example, the load characteristic of the fuel injection valve 2.

The energization instruction time Ti of the energization instruction TQ is input to the energization control unit 5b of the control IC 5, and the correction coefficients α, β are input to the energization time correction amount calculation unit 5d. When energization instruction time Ti of the energization instruction TQ is input to the energization control unit 5b of the control IC 5, the energization control unit 5b applies power (e.g., the boost voltage Vboost) to the fuel injection valve 2 from the drive circuit 6. On the other hand, the energization time correction amount calculation unit 5d of the control IC 5 calculates the energization time correction amount ΔTi by acquiring a current flowing through the fuel injection valve 2 and performing area correction on the acquired current when the energization control unit 5b current-drives the fuel injection valve 2 to cause the fuel injection valve 2 to inject fuel.

The energization time correction amount calculation unit 5d feeds back the calculated energization time correction amount ΔTi to the energization control unit 5b. The energization control unit 5b reflects, in real time, the energization time correction amount ΔTi in the energization instruction time Ti of the energization instruction TQ input corresponding to a certain injection to control energization of the fuel injection valve 2.

The microcomputer 4 has a configuration in which the diagnosis function is performed to determine whether or not the calculation process of the energization time correction amount ΔTi by the control IC 5 described above is normally performed, and the process after abnormality detection is performed.

The abnormality determination unit 12 retrieves the data of the energization time correction amount ΔTi calculated by the energization time correction amount calculation unit 5d of the control IC 5 and determines whether or not the preset upper limit value ΔTmax is exceeded. If the value exceeds the upper limit value ΔTmax, the unit 12 outputs a ΔTi abnormal diagnosis signal to the correction amount subtraction setting unit 11. Further, when the abnormality determination unit 12 determines the ΔTi abnormality, the abnormality determination unit 12 outputs a ΔTi calculation stop command to the energization time correction amount calculation unit 5d of the control IC 5.

The engine load factor calculation unit 13 retrieves information on the intake air amount from the air flow meter 9 as engine load data, calculates the engine load factor, and outputs it to the correction amount subtraction setting unit 11.

In the correction amount subtraction setting unit 11, information on the energization time correction amount ΔTi is input from the energization time correction amount calculation unit 5d of the control IC 5, and when an abnormality is detected from the abnormality determination unit 12, a diagnostic signal of ΔTi abnormality is input. The correction amount subtraction setting unit 11 reads out, from the map 14, the value of the number of division times defined as N of ΔTi corresponding to the engine load factor input from the engine load factor calculation unit 13 when the diagnostic signal of ΔTi abnormality is input from the abnormality determination unit 12.

The correction amount subtraction setting unit 11 gradually subtracts and sets the energization time correction amount ΔTi set at the time of abnormality determination according to the value of the number of divisions N of ΔTi read from the map 14, and outputs to the energization instruction time calculation unit 10. The energization instruction time calculation unit 10 outputs the energization instruction TQ of the energization time Ti by subtracting the energization time correction amount ΔTi stepwise according to this to the control IC 5.

Hereinafter, detailed operation description of the case of multi-stage in-cylinder injection from the fuel injection valve 2 will be described. When the battery voltage VB is applied to the electronic control unit 1, the microcomputer 4 and the control IC 5 are activated. The boost control unit 5a of the control IC 5 boosts the output voltage of the boost circuit 3 by outputting a boost control pulse to the boost circuit 3. The boost voltage Vboost is charged to a predetermined boost completion voltage that exceeds the battery voltage VB.

At ON timing t0 when an energization instruction is issued, that is, at the start of energization and peak current control, the microcomputer 4 calculates, using the energization instruction time calculation unit 10, the required injection quantity and the energization instruction time Ti of the energization instruction TQ, and outputs the calculated energization instruction time Ti to the energization control unit 5b of the control IC 5. Accordingly, the microcomputer 4 provides the control IC 5 with the energization instruction time Ti through the energization instruction TQ.

The control IC 5 stores, in an internal memory, the normal current profile PI serving as a target current to be passed to the fuel injection valve 2 and performs the peak current control so that the energization current reaches the target peak current $I_{pk}$ by applying the boost voltage Vboost to the fuel injection valve 2 on the basis of the normal current profile PI under control of the energization control unit 5b.

Figure 3:
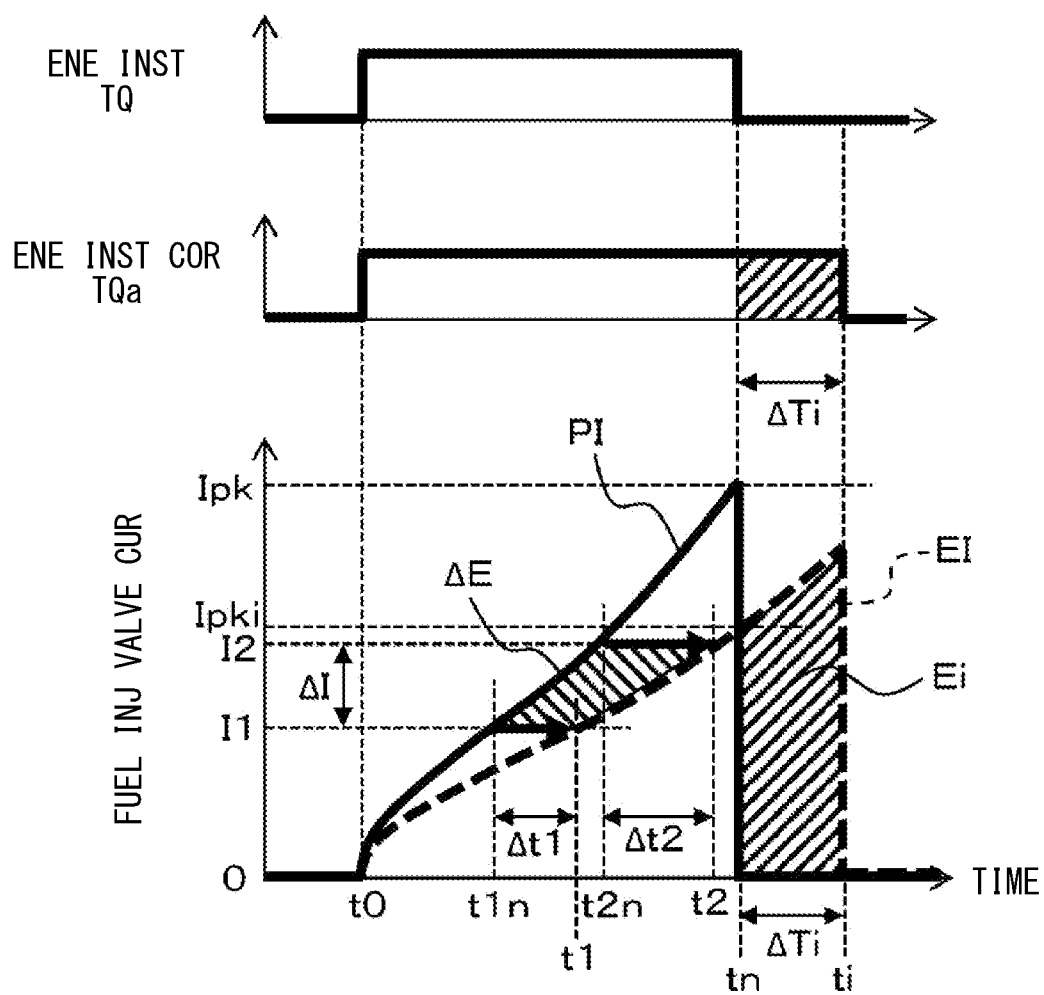
FIG. 3 is an explanatory diagram of a method for calculating an integrated current difference.
Figure 4:
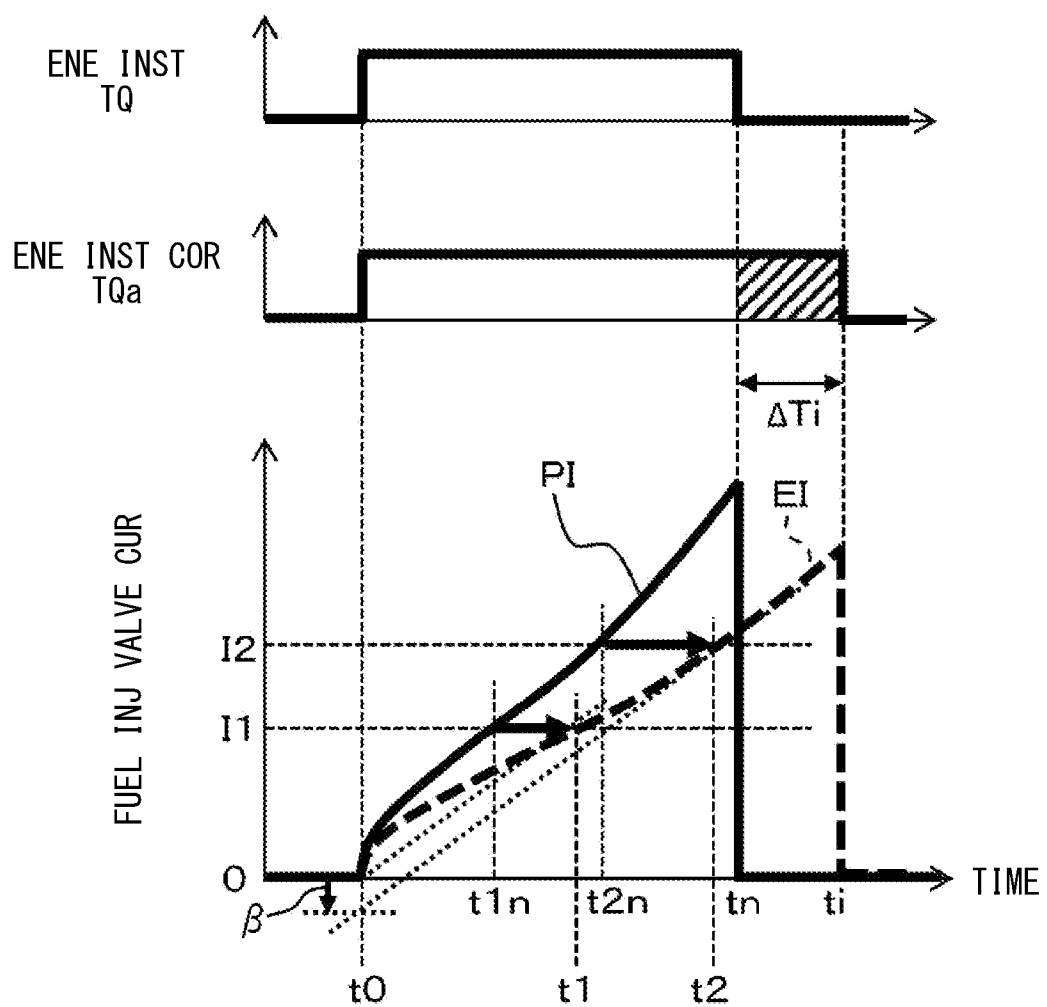
FIG. 4 is an explanatory diagram of a method for calculating a peak current estimation value.

The control IC 5 continuously applies the boost voltage Vboost to between terminals of the solenoid coil 2a until the energization current reaches the peak current target value Ipk indicated by the ideal current profile on the basis of the energization instruction time Ti of the energization instruction TQ. The energization current EI of the fuel injection valve 2 rapidly increases to open the fuel injection valve 2. As illustrated in FIG. 3, the energization current EI of the fuel injection valve 2 nonlinearly varies on the basis of the structure of the fuel injection valve 2. At this time, the current gradient of the energizing current EI becomes smaller than the gradient of the ideal current profile PI, and the injection energy into the fuel injection valve 2a may be insufficient at the time tn.

The energization time correction amount calculation unit 5d calculates an energy shortage Ei which is the integrated current difference between the normal current profile PI and the actual current EI passed to the fuel injection valve 2. The energy shortage Ei corresponds to an area surrounded by nonlinear current curves. Thus, in order to calculate the energy shortage Ei in detail, an operation load tends to increase. Thus, the area ΔE of a trapezoid with four vertices (t1n, I1), (t1, I1), (t2n, I2), (t2, I2) illustrated in FIG. 3 may be regarded as being substantially proportional to the energy shortage Ei for simple calculation.

[Equation 1]

$$\Delta E = \{(t1 - t1n) + (t2 - t2n)\} \times (I2 - I1)/2 \quad (1)$$

Thus, the energization time correction amount calculation unit 5d can simply calculate the integrated current difference between the normal current profile PI from ideal arrival time t1n to reach a current threshold I1 to ideal arrival time t2n to reach a current threshold I2 and the energization current EI of the fuel injection valve 2 from arrival time t1 to actually reach the current threshold I1 to arrival time t2 to actually reach the current threshold I2, that is, the area ΔE. The energization time correction amount calculation unit 5d calculates the energy shortage Ei by multiplying the calculated area ΔE by the correction coefficient α, which is previously set, as represented by Equation (2).

[Equation 2]

$$\begin{aligned} Ei &= \Delta E \times \alpha \\ &= \{(t1 - t1n) + (t2 - t2n)\} \times (I2 - I1)/2 \times \alpha \end{aligned} \quad (2)$$

As illustrated in FIG. 3, the energization time correction amount calculation unit 5d calculates the peak current estimation value Ipki at a point in time when the energization instruction time Ti indicated by the energization instruction TQ elapses by calculating a current gradient from the ON timing t0 of an injection instruction signal to the arrival time t1 to reach the current threshold I1. At this time, the peak current estimation value Ipki can be calculated by adding the correction coefficient β as an intercept as represented by Equation (3) taking into consideration that the energization current EI is nonlinear.

[Equation 3]

$$Ipki = \frac{I1}{t1} \times Ti + \beta \quad (3)$$

The correction coefficient β is set as an offset term for accurately estimating the peak current estimation value Ipki at application OFF timing to of the ideal current profile PI. Although, in Equation (3), the current gradient of the energization current profile EI is calculated as the gradient from the ON timing t0 of the energization instruction TQ to the time t1 to reach the current threshold I1, the current gradient may be calculated as the gradient from the ON timing t0 to the time t2 to reach the current threshold I2.

Next, as illustrated in FIG. 3, the energization time correction amount calculation unit 5d calculates the energization time correction amount ΔTi for compensating for the energy shortage Ei. Specifically, as represented by Equation (4), the energization time correction amount calculation unit 5d calculates the energization time correction amount ΔTi by dividing the calculated energy shortage Ei by the estimated peak current estimation value Ipki.

[Equation 4]

$$\begin{aligned} \Delta Ti &= \frac{Ei}{Ipki} \\ &= \frac{\{(t1 - t1n) + (t2 - t2n)\} \times (I2 - I1)/2 \times \alpha}{\frac{I1}{t1} \times Ti + \beta} \\ &= \frac{\{(t1 - t1n) + (t2 - t2n)\} \times (I2 - I1) \times \alpha x \times t1}{I1 \times Ti + \beta \times t1} \end{aligned} \quad (4)$$

HERE, $\alpha x = \alpha/2$

Although, in the above Equation (4), multiplication by a gain value for converting an A/D conversion value of the detected current I1, I2 into a physical quantity is actually performed, this multiplication is omitted in Equation (4). Note that, in Equation (4), the term including division by 2 is indicated as ax so as to be included in the coefficient α. It is possible to reduce an operation load required for a process for calculating an extension time for compensating for the energy shortage Ei by deriving the energization time correction amount ΔTi using Equation (4) dependent on the energy shortage Ei and the peak current estimation value Ipki.

When the energization time correction amount calculation unit 5d outputs the calculated energization time correction amount ΔTi to the energization control unit 5b, the energization control unit 5b corrects the energization instruction time Ti to an energization instruction calculated value of the energization instruction TQ+the energization time correction amount ΔTi as a corrected energization instruction time Ti of the energization instruction TQ by timing when a current I detected by the current monitoring unit 5c reaches the peak current estimation value Ipki. This makes it possible to simply correct the energization instruction time Ti of the energization instruction TQ and extend the energization time.

The energization time correction amount calculation unit 5d calculates the energization time correction amount ΔTi in a period from when the current I reaches the current threshold I2 to the timing to when the current I reaches the peak current estimation value Ipki. Thus, the energization instruction time Ti can be corrected with sufficient time. Although a mode in which the energization instruction time correction amount ΔTi is calculated using Equations (1) to (4) has been described, these equations merely show an example, and the present invention is not limited to this method.

For the correction coefficient α, the α map can be set corresponding to all settable energization times. The energization time correction amount calculation unit 5d can calculate the energization time correction amount ΔTi by performing the area correction using the correction coefficients α, β every time injection is performed as described above regardless of whether the driving current of the fuel injection valve 2 has reached the target peak current Ipk. The conversion coefficient setting unit 11 can set the conversion coefficient α each time the area correction is performed, whereby the energization instruction time correction amount ΔTi in which the conversion coefficient α is changed for each fuel injection can be set.

Figure 5:
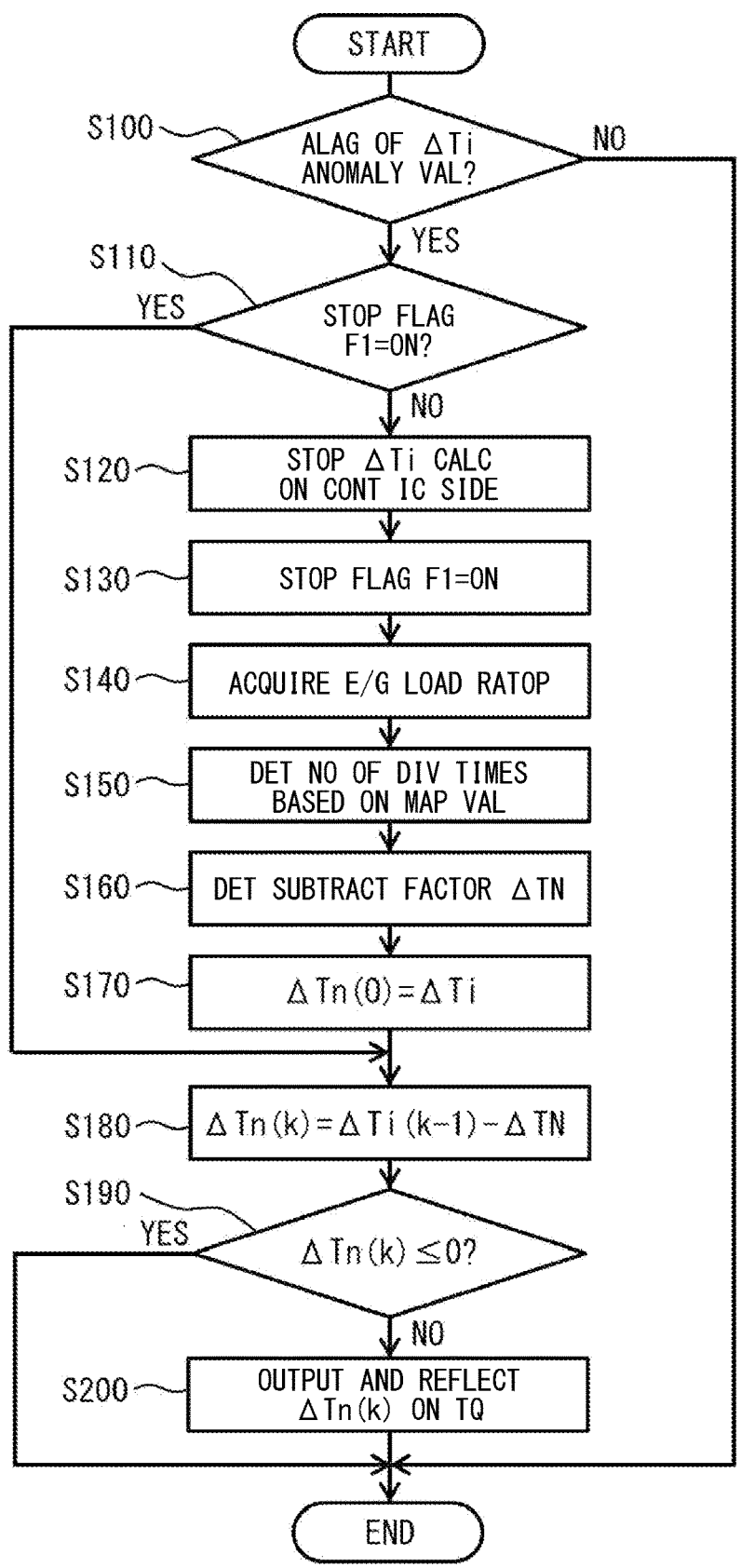
FIG. 5 is a flow chart of processing after diagnosis.

Next, with reference to FIGS. 5 to 7, the operation when the microcomputer 4 executes the diagnostic detection process for the result of the calculation process of the energization instruction time correction amount ΔTi by the control IC 5 will be described. FIG. 5 shows the flow of the abnormality determination by the microcomputer 4 and the subsequent processing contents. The microcomputer 4 is set to execute the process of FIG. 5 every time it receives the data of the energization instruction time correction amount ΔTi.

When the microcomputer 4 starts the process, first, in step S100, the abnormality determination unit 12 retrieves the value of the energization instruction time correction amount ΔTi calculated by the energization time correction amount calculation unit 5d of the control IC 5, and the microcomputer 4 compares it with the preset upper limit value ΔTmax to determine whether or not it exceeds the upper limit value ΔTmax. When the received energization instruction time correction amount ΔTi is equal to or less than the upper limit value ΔTmax, the microcomputer 4 determines NO in the abnormality determination unit 12 and ends the process.

On the other hand, when the value of the energization instruction time correction amount ΔTi exceeds the upper limit value ΔTmax, the microcomputer 4 determines the abnormal value diagnosis in the abnormality determination unit 12 and proceeds to step S110. When an abnormal value diagnosis is determined, the subsequent energization instruction time correction processing is not performed, and the energization instruction time correction amount ΔTi that was set last is subtracted until it becomes zero as follows to execute the process for returning to the energization instruction time Ti.

Actually, when the value of the energization instruction time correction amount ΔTi exceeds the upper limit value ΔTmax, and this situation is continuously detected a plurality of times, the microcomputer 4 executes the determination of the abnormality value diagnosis by the abnormality determination unit 12. As a result, the abnormal state is not determined in case of the influence of noise or when the energization instruction time correction amount ΔTi temporarily exceeds the upper limit value ΔTmax and immediately returns to the upper limit value ΔTmax or less. Therefore, the setting of a plurality of times may be set to two or more times, and it may be preferable to set the number of times according to the actual situation.

In step S110, the microcomputer 4 determines whether or not the stop flag F1 is ON. When the ΔTi abnormal value diagnosis is determined for the first time, the microcomputer 4 determines NO and proceeds to step S120 because the stop flag F1 is still in the off state.

In step S120, the microcomputer 4 outputs a stop command for the ΔTi calculation process to the energization time correction amount calculation unit 5d of the control IC 5 by the abnormality determination unit 12, and stops the subsequent operations. Next, the microcomputer 4 proceeds to step S130, sets the stop flag F1 to ON, and in the following step S140, the correction amount subtraction setting unit 11 acquires the engine load factor from the engine load factor calculation unit 13, and it proceeds to step S150.

In step S150, the microcomputer 4 acquires the ΔTi reduction division times defined as N times (hereinafter, simply referred to as "division count N") corresponding to the engine load factor data acquired by the correction amount subtraction setting unit 11 by referring the map 14. As shown in FIG. 6, for example, the map 14 is provided as data in which the required number of divisions N is set with respect to the engine load factor [%].

The microcomputer 4 determines by reading the number of divisions N from the map 14 with respect to the engine load factor [%]. Further, the number of divisions N can be set as "1" when the engine is in a high load state to correspond to a case where there is no difficulty even if the energization instruction time correction amount ΔTi is directly canceled to zero.

Figure 6:
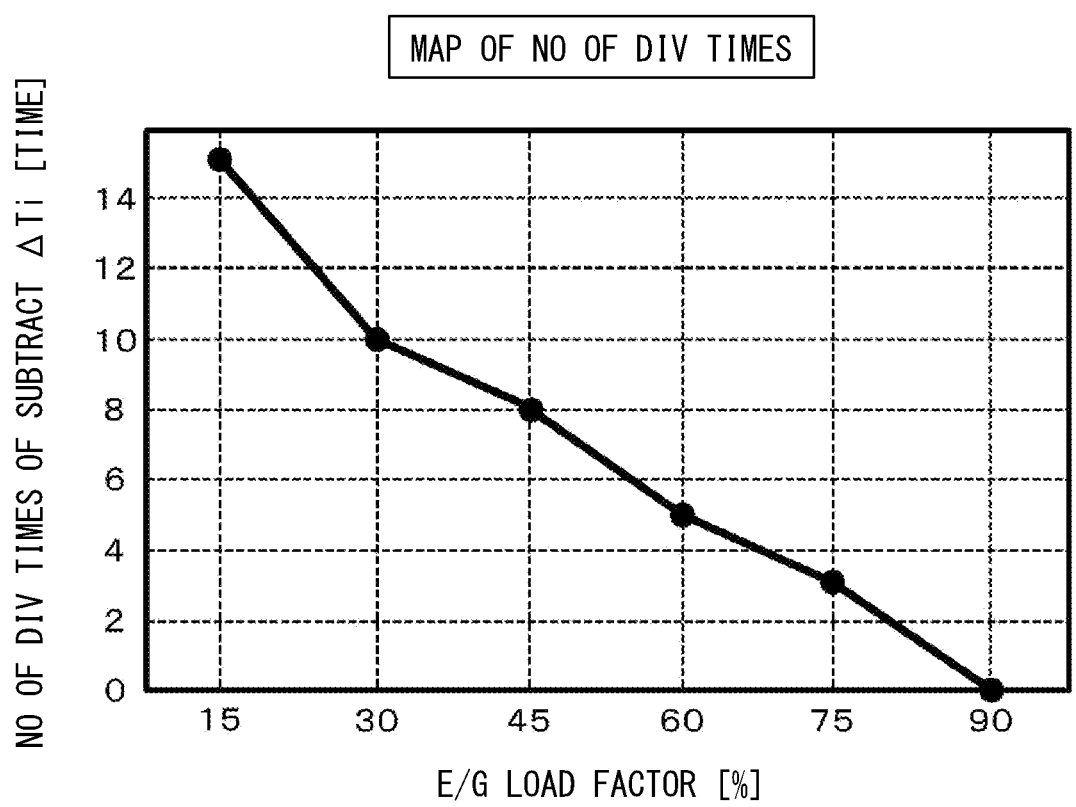
FIG. 6 is an example of a map of the number of divisions of energization time correction with respect to the engine load factor.
Figure 7:
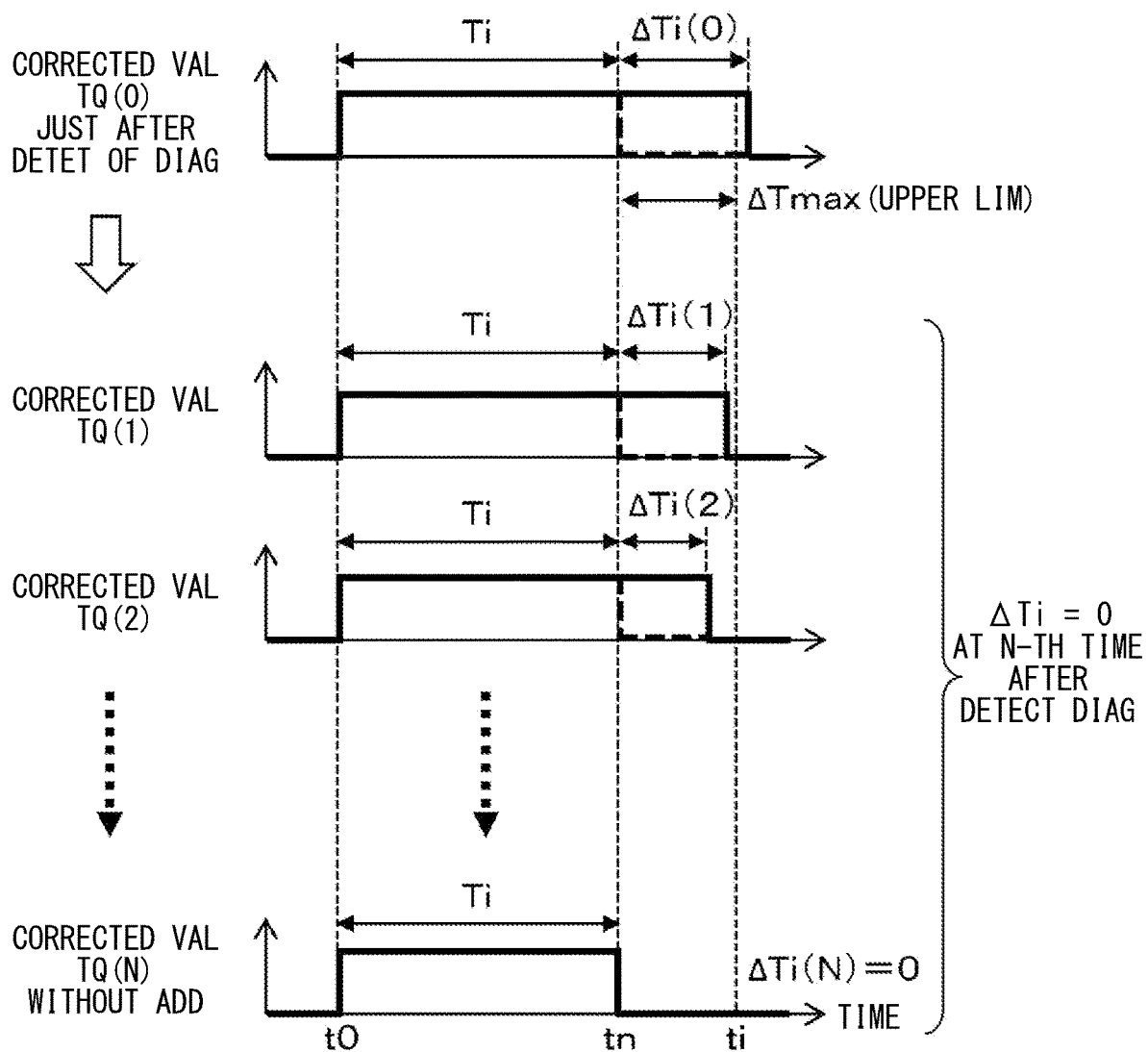
FIG. 7 is an explanatory diagram showing a change state of the energization instruction TQ after correction.

In the data of the map 14 shown in FIG. 6, when the engine load factor is high, the number of divisions N is set small, and when the engine load factor is low, the number of divisions is set large.

Next, in step S160, the microcomputer 4 divides the last input energization instruction time correction amount ΔTi by the determined division number N by the correction amount subtraction setting unit 11 to determine the reduction rate ΔTN of ΔTi. Here, the reason for setting the reduction rate ΔTN is as follows.

That is, if the energization instruction time correction amount ΔTi is immediately returned to zero at the time when the abnormal value diagnosis is determined, A/F roughness will occur. In particular, when the engine load factor is low, the total injection amount is small, so the injection amount decreases due to a sudden decrease in the energization instruction time, which has a large effect on the A/F and may cause engine stall.

When the microcomputer 4 proceeds to step S170, the correction amount subtraction setting unit 11 sets ΔTi as the initial value of the correction amount ΔTn. That is, as shown in FIG. 7, the first correction amount ΔTn (1) is set to a time period equal to the energization instruction time correction amount ΔTi finally calculated by the control IC 5.

When the microcomputer 4 proceeds to the following step S180, the correction amount subtraction setting unit 11 sets the correction amount ΔTn (k) for the k-th time as the value prepared by subtracting ΔTN from the previous correction amount ΔTn (k−1) as shown in the following equation (5).

$$\Delta Tn(k) = \Delta Tn(k-1) - \Delta TN \qquad (5)$$

Here, the correction amount ΔTn (1) for the first time is set by subtracting the reduction rate ΔTN calculated in step S160 from the initial value ΔTn (0) set in step S170.

After that, the microcomputer 4 proceeds to step S190 and determines whether or not the correction amount ΔTn (k) calculated in step S180 is 0 or less. If NO, the process proceeds to step S200, and the energization instruction time calculation unit 10 reflects the correction amount ΔTn (k) set in step S180 in the energization instruction time Ti to generate the corrected energization instruction TQ (k), and output to the control IC5. Here, it is output as the energization instruction TQ (1) after the first correction.

As described above, the microcomputer 4 ends the initial processing after the diagnosis is detected. Then, after that, the microcomputer 4 executes the process after the diagnosis of FIG. 5 for each fuel injection control cycle. In the second and subsequent processes, since the microcomputer 4 has determined that there is a ΔTi abnormal value diagnosis in the previous process, it is determined as YES in step S100 and the process proceeds to step S110. Here, since the stop flag F1 is set to ON in the previous processing, it is determined as YES, and the process jumps to step S180.

In step S180, the microcomputer 4 calculates the correction amount ΔTn (k) according to the equation (5), and in step S200 through step S190, the energization instruction time calculation unit 10 reflects the previously set correction amount ΔTn (k) on the energization instruction time Ti to generate the corrected energization instruction TQ (k) and output it to the control IC 5. Since this is the second time, the correction amount ΔTn (2) is a value obtained by subtracting ΔTN from the previous correction amount ΔTn (1) as shown in FIG. 7, and the corrected TQ (2) is generated.

Hereinafter, in the same manner, the microcomputer 4 sequentially reduces the correction amount ΔTn (k) by repeatedly executing the process of FIG. 5, and repeats N times until the correction amount ΔTn (N) finally becomes 0. Then, YES is set in step S190, and the process ends. As a result, the correction amount ΔTn (N) becomes zero, and the energization instruction time calculation unit 10 obtains the energization instruction time Ti specified by the corrected energization instruction TQ (N), and the energization instruction time correction amount ΔTi by the control IC 5 is set to zero.

According to the present embodiment as described above, by setting the correction amount ΔTn (k) over N times as described above, it is possible to control to gradually reduce ΔTi stepwise after the diagnosis is detected. This can prevent A/F roughness.

Further, in the above embodiment, the number of divisions N of the energization instruction time correction amount ΔTi finally calculated by the control IC 5 is calculated by referring to the map 14 according to the engine state of the vehicle. Therefore, for example, when the load is low, the fine divisions are executed to prevent A/F roughness, and when the load is high, the influence of the correction amount on the total injection amount is small, so that the correction can be stopped after the diagnosis is detected as in the conceivable case.

Further, the timing for reducing the energization instruction time correction amount ΔTi may be performed in units of a predetermined number of times or a predetermined cycle.

OTHER EMBODIMENTS

The present disclosure should not be limited to the embodiments described above, and various modifications may further be implemented without departing from the gist of the present disclosure. For example, the following modifications or extensions are possible. The embodiments described above may be combined as necessary.

In the above embodiment, the present invention is applied, as the fuel injection valve 2, to direct injection that directly injects fuel into a combustion chamber of the internal combustion engine. However, the present invention is not limited thereto and may be applied to port injection that injects fuel in front of a known intake valve.

The above embodiment describes the mode in which the energy shortage ΔE corresponding to the integrated current difference is simply calculated by calculating the area of the trapezoid. However, when the computing power is high, the energy shortage ΔE can be calculated under a condition for further increasing the accuracy.

The energization current EI of the fuel injection valve 2 nonlinearly varies both before and after reaching the peak current Ipk. Thus, it is preferable to simply calculate the integrated current difference by approximately calculating the integrated current using a polygon such as a triangle, a rectangle, or a trapezoid.

Although the mode in which the microcomputer 4 and the control IC 5 are configured as separate integrated circuits has been described, the microcomputer 4 and the control IC 5 may be integrated with each other. In this case, it is preferable to use an arithmetic processor capable of performing a high-speed operation.

The present invention has been described in accordance with the embodiment described above. However, it is to be understood that the present invention is not limited to the embodiment and structure. The present disclosure encompasses various modifications and variations within the scope of equivalents. In addition, various modes/combinations, one or more elements added/subtracted thereto/therefrom, may also be considered as the present disclosure and understood as the technical thought thereof.

In the drawing, 1 is an electronic control device (injection control device), 2 is a fuel injection valve, 4 is a microcomputer (microcomputer), 5 is a control IC, 5b is an energization control unit, 5d is an energization time correction amount calculation unit, and 9 is an air flow meter (sensor), 10 is an energization instruction time calculation unit, 11 is a correction amount subtraction setting unit, and 12 is an abnormality determination unit.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An injection control device that executes a current drive of a fuel injection valve for injecting fuel into an engine, the injection control device comprising:
    a drive control unit that controls energization by correcting an energization instruction time when injecting the fuel by executing the current-drive of the fuel injection valve, and includes an energization time correction amount calculation unit that calculates an energization time correction amount by performing area correction on a current flowing through the fuel injection valve;
    an abnormality determination unit that determines an abnormality in a control system of the drive control unit when the energization time correction amount calculated by the drive control unit exceeds a predetermined upper limit value; and
    a correction amount subtraction setting unit that stops a calculation of the energization time correction amount by the energization time correction amount calculation unit when the abnormality determination unit determines an abnormality in the control system of the drive control unit, and controls the drive control unit to directly or stepwise reduce the energization time correction amount at an abnormality determination.

2. The injection control device according to claim 1, further comprising:
a sensor for detecting a load factor of the engine, wherein:
the correction amount subtraction setting unit sets a numerical number of steps to reduce the energization time correction amount to be larger as the load factor of the engine detected by the sensor is higher.

3. The injection control device according to claim 1, wherein:
the correction amount subtraction setting unit controls the drive control unit to reduce the energization time correction amount at the time of determining the abnormality from the upper limit value to zero.

4. The injection control device according to claim 1, wherein:
the correction amount subtraction setting unit controls the drive control unit to stepwise reduce the energization time correction amount at the time of determining the abnormality from the upper limit value by a predetermined numerical number of steps.

5. The injection control device according to claim 1, wherein:
the correction amount subtraction setting unit controls the drive control unit to stepwise reduce the energization time correction amount at the time of determining the abnormality from the upper limit value at every predetermined period.

6. The injection control device according to claim 1, further comprising:
one or more processors; and
a memory coupled to the one or more processors and storing program instructions that when executed by the one or more processors cause the one or more processors to provide at least: the drive control unit; the abnormality determination unit; and the correction amount subtraction setting unit.

* * * * *